United States Patent [19]
Hatada et al.

[11] Patent Number: 6,018,454
[45] Date of Patent: Jan. 25, 2000

[54] METALLIZED FILM, A PRODUCTION METHOD THEREOF, AND A CAPACITOR USING IT

[75] Inventors: Kenji Hatada; Manichi Yuuki, both of Shiga, Japan

[73] Assignee: Toray Industries, Inc., Japan

[21] Appl. No.: 09/064,669

[22] Filed: Apr. 23, 1998

[30] Foreign Application Priority Data

Apr. 25, 1997 [JP] Japan .................................. 9-109376

[51] Int. Cl.⁷ .................................................. H01G 4/22
[52] U.S. Cl. ........................ 361/314; 361/315; 361/319; 428/319.3
[58] Field of Search ................................... 361/303, 304, 361/305, 311–312, 314, 315, 319; 252/500, 502; 428/41.7, 354, 336, 319.3, 481–483

[56] References Cited

U.S. PATENT DOCUMENTS 3,865,626  2/1975  Diener et al. ........................ 428/408
4,339,303  7/1982  Frisch et al. ........................ 156/629
5,563,424  10/1996  Yang et al. ........................ 257/40
5,612,107  3/1997  Sangani et al. ........................ 428/41.7

*Primary Examiner*—Kristine Kincaid
*Assistant Examiner*—Anthony Dinkins
*Attorney, Agent, or Firm*—Austin R. Miller

[57] ABSTRACT

A metallized film including a polymer film, a metal layer having a surface resistance of about 1 $\Omega$/sq. to about 15 $\Omega$/sq. deposited on a portion of the polymer film, the polymer film having another portion defined as a margin having a surface resistance of about $1\times10^{10}$ $\Omega$/sq. or more, which portion is free of deposited metal; and an about 0.02 to about 1 mm wide boundary zone of deposited metal formed between the deposited metal layer and the margin which substantially continuously decreases in thickness from the deposited metal layer to the margin.

23 Claims, 6 Drawing Sheets

METALLIZED FILM, A PRODUCTION METHOD THEREOF, AND A CAPACITOR USING IT

TECHNICAL FIELD

This invention relates to a metallized polymer film capacitor used in an electric or electronic circuit, particularly a capacitor used as an across-the-line capacitor. More particularly, it relates to a capacitor in conformity with various safety standards for ensuring that capacitors are not broken or burned out by surging current due to lightning, anomalies and the like. The invention also relates to a metallized film suitable for obtaining the capacitor, and a production method thereof.

BACKGROUND ART

Noise filter capacitors are used for eliminating noise emanating from the power lines of various household electric appliances and electronic apparatii and for preventing noise generated in such apparatii from going into the power lines. It is possible for a large rush of current to surge into capacitors, including noise filter capacitors, when lightning strikes. Lest capacitors should be broken or burned out by the surge, standards are established in respective nations to specify severe tests to be performed for capacitors such as noise filter capacitors (hereinafter sometimes referred to as "safety standards" or "standards"). The standards include, UL 1414, CAS C22.2 NO1, VDE 0565-1, IEC 384-14, SEV 1055, JIS C 5151, NEMKO, SEMKO, DEMKO, E1, BS, and the like.

These standards, assuming a large surge, specify that when a voltage that is very high compared to the rated voltage is applied for a certain time, the capacitor shall not become abnormal, burned out or broken.

To conform to these standards, an 11 to 12 $\mu$m thick polyester film and an aluminum deposited film with a wide margin width have been used. However, they have the problem that the defective fraction is large since their quality standards conform to a very narrow tolerance range. In other words, the rejection rate in safety voltage tests is large. On the other hand, there is a strong demand for downsizing capacitors, and if the film thickness is reduced for downsizing, the defective fraction increases.

OBJECTS OF THE INVENTION

Figure 1:
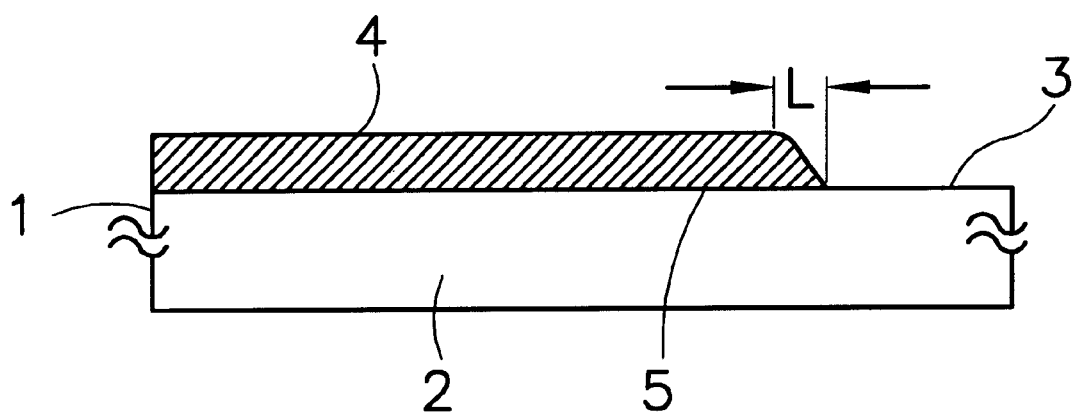
FIG. 1 is a schematic sectional view of an example of a sectional form of the metallized film of the invention.

An object of the invention is to provide a capacitor that can be manufactured in large quantities with few defects and can prevent the dielectric breakdown of the polymer film particularly at the margin and the boundary with the deposited metal layer zone that is likely to suffer damage due to high voltages applied in the tests of safety standards.

It is another object of the invention to provide a small capacitor excellent in performance, a metallized film used for producing it, and a production process thereof.

Other objects and advantages of the invention will become apparent to those skilled in the art from the drawings, the detailed description of the invention and the appended claims.

SUMMARY OF THE INVENTION

The invention in one aspect includes a metallized film comprising a deposited metal layer zone destined to be an electrode with a surface resistance of about 1 $\Omega$/sq. to about 15 $\Omega$/sq., a margin with a surface resistance of about $1 \times 10^{10}$ $\Omega$/sq. or more, and an about 0.02 to about 1 mm wide boundary zone existing between the deposited metal layer zone and the margin and continuously decreasing in the thickness of the deposited metal layer from the deposited metal layer zone to the margin, at least on one side of a high molecular weight polymer film.

In another aspect the invention includes a method for producing a metallized film comprising forming a metallized polymer film by vapor-depositing an oil on the surface of a high molecular weight polymer film or coating the surface of the polymer film with an oil and, subsequently, vapor-depositing a metal in a vacuum metallizer. The quantity of the oil applied by vapor deposition or coating is controlled to keep the width of the boundary zone between the deposited metal layer zone and the margin in a specified range of about 0.02 to about 1 mm.

In still another aspect the invention is a capacitor produced by winding into a roll or stacking high molecular weight polymer films respectively having a deposited metal layer zone destined to be an electrode with a surface resistance of about 1 $\Omega$/sq. to about 15 $\Omega$/sq., a margin with a surface resistance of about $1 \times 10^{10}$ $\Omega$/sq. or more, and an about 0.02 to about 1 mm wide boundary zone existing between the deposited metal layer zone and the margin and continuously decreasing in the thickness of the deposited metal layer from the deposited metal layer zone to the margin, at least on one side of a polymer film.

An especially advantageous feature of the invention is that the metallized film has a specific boundary zone, i.e., an about 0.02 to about 1 mm wide boundary zone where the thickness of the deposited metal layer decreases continuously from the deposited metal layer zone to the margin, and that if the metallized film is used to make a capacitor, the dielectric breakdown of the polymer film at the margin and the boundary zone is prevented.

DETAILED DESCRIPTION OF THE INVENTION

It will be appreciated that the following description is intended to refer to the specific embodiments of the invention selected for illustration in the drawings and is not intended to define or limit the invention, other than in the appended claims.

A schematic sectional view of one embodiment of a metallized film of the invention is shown in FIG. 1. In FIG.

1, the following numbers denote various components: 1 denotes the metallized film of the invention; 2, a high molecular weight polymer film; 3, a margin; 4, a deposited metal layer zone; 5, a boundary zone; and L, the width of the boundary zone.

The polymer film 2 is obtained by molding a natural or semi-synthetic or synthetic high molecular weight polymer resin. A polymer film made of a synthetic high molecular weight polymer resin is preferred in view of its heat resistance, mechanical properties, electric properties and physicochemical properties.

Preferred synthetic high polymer resins which can be used here include polyolefin resins, polyester resins, polyamide resins, polyimide resins, polyamidoimide resins, polycarbonate resins, polysulfone resins, polyphenylene resins, polyarylate resins, fluorine resins, polystyrene resin, polyallylene resin and the like. Polypropylene, polyethylene terephthalate, polyethylene naphthalate, polyphenylene sulfide, polycarbonate and polystyrene are especially preferred because of their mechanical and electric properties. Polypropylene, polyethylene terephthalate and polyethylene naphthalate are most especially preferred in view of their ability to withstand high voltage.

The metal of the deposited metal layer zone 4 is not especially limited so long as it is electrically conductive. It may be selected from Al, Zn, Cu, Ag, Au, Sn, Ti, Co, Ni, their alloys and the like. Al, Zn, Cu and Sn are especially preferred in view of their corona deterioration resistance. Al—Zn alloy is even more preferred in view of its moisture resistance, corona deterioration resistance and self-healability. Especially preferred is a deposited metal layer formed by an Al—Zn alloy, the Al content ratio {(Al content×100)/(Al content+Zn content)} of which changes continuously according to C2<C1≦C3 or C2<C3≦C1 (where C1 is the Al content ratio at the surface of the deposited metal layer; C2, the Al content ratio at the center in the thickness of the deposited metal layer; and C3, the Al content ratio at the interface with the polymer film) in the deposited metal layer and is about 0.5 to about 15 wt %, preferably about 8 to about 12 wt % in the entire deposited metal layer. An Al—Zn alloy with an Al content ratio distribution of C2<C1≦C3 is preferred since its self-healability is less deteriorated.

Figure 2:
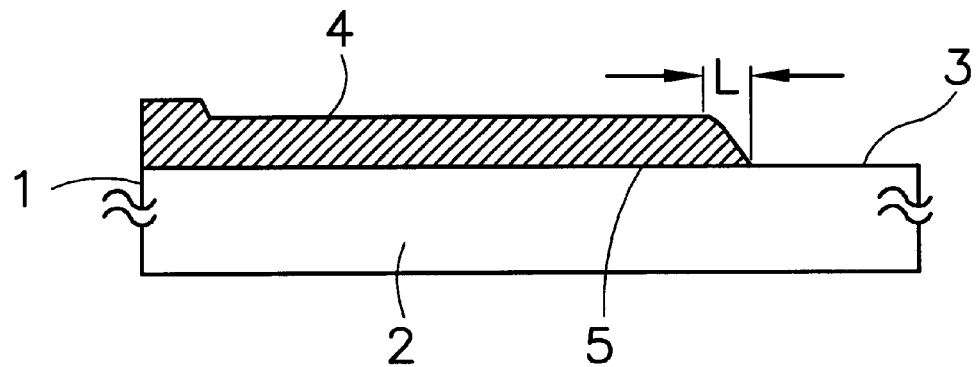
FIG. 2 is a schematic sectional view of another example of the sectional form of the metallized film of the invention.

The resistance of the deposited metal layer must be about 1 to about 15 Ω/sq. An especially preferable range is about 2 to about 12 Ω/sq. If the resistance of the electrode portion (active portion) is 4 to 12 Ω/sq. when the deposited metal layer is made thicker in an about 2 to 5 mm portion in contact with the schoop layer as a so-called heavy edge, as shown in FIG. 2, for improving the adhesiveness to the schoop layer, the ability to withstand high voltage and tan δ characteristic is improved.

It is more preferable to form a very thin layer of an oil or deposited silicon or deposited silicon compound on the surface of the deposited metal layer to raise the moisture resistance of the deposited metal layer.

It is important that the metallized film has a boundary zone 5 between the deposited metal layer zone 4 and the margin 3. The boundary zone refers to a region in which the thickness of the deposited metal layer continuously decreases from the deposited metal layer zone 4 to the margin 3 as shown in FIG. 1. When observed by an optical microscope, the boundary zone refers to a region with a width (L) of about 0.02 to about 1 mm, preferably about 0.02 to about 0.5 mm, more preferably about 0.02 to about 0.25 mm, especially preferably about 0.05 to about 0.2 mm where the brightness changes gradually from the dark portion of the deposited metal layer zone 4 to the bright portion of the margin 3 as shown in FIG. 1.

Conventional metallized films for capacitors must not have a continuously unclear portion at the end of the deposited metal layer as specified in 4.3 "Margin width" of JIS C 2319-1977 (Metallized polyester films for capacitors). One of the preferably used conventional margin forming methods is the tape margin method in which a tape as wide as the margin is placed as a mask on the polymer film to be metallized for forming a non-metallized zone (margin) as a margin with a clear boundary between the deposited metal layer zone and the margin. Another conventional method is the oil margin method in which an oil is deposited by evaporation at a width to form the margin on the high polymer film since the deposited metal layer does not adhere to the oil portion.

To clarify the boundary with the margin (not to form the boundary zone 5) as in the tape margin method, it has been proposed to use a special fluorine based oil unlikely to allow the deposition of the metal as stated in Japanese Patent Publication (Kokoku) No. 3-59981 or to cool the film before or when the film passes over the metallization source as stated in Japanese Patent Publication (Kokoku) No. 63-57932. These conventional techniques do not contain any technical idea at all that a boundary zone with a specific width is formed and controlled as in the invention.

The invention was completed based on the surprising finding that if a boundary zone 5 with a specific width is formed, the dielectric breakdown of the polymer film particularly at the boundary between the margin and the deposited metal layer zone where breakdown mainly occurs can be prevented even if high voltages are applied in the capacitor test in conformity with the safety standards. If dielectric breakdown occurs at the boundary between the margin and the deposited metal layer zone, it often appears as a phenomenon that the schoop layer of the capacitor is broken.

Figure 3:
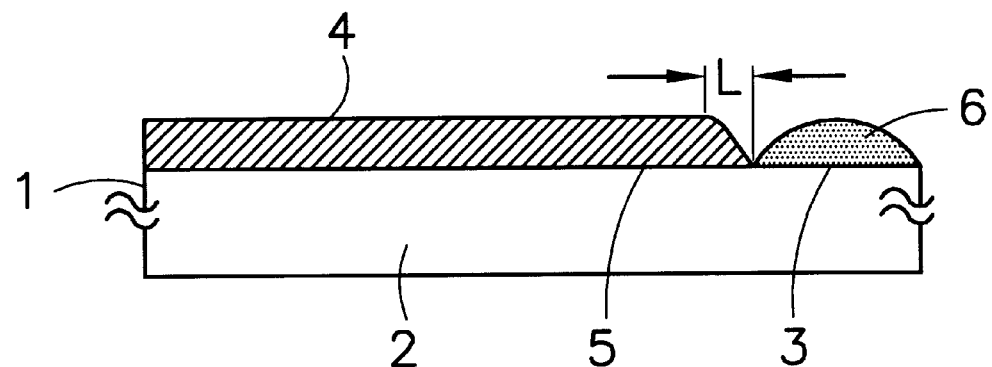
FIG. 3 is a schematic sectional view of a further example of the sectional form of the metallized film of the invention.

Furthermore, as shown in FIG. 3, it is more preferable that the margin 3 is covered with an oil 6. The amount of the oil is too slight to be specified, but the existence of the oil can be detected by X-ray electron spectroscopy (XPS or ESCA).

Figure 4:
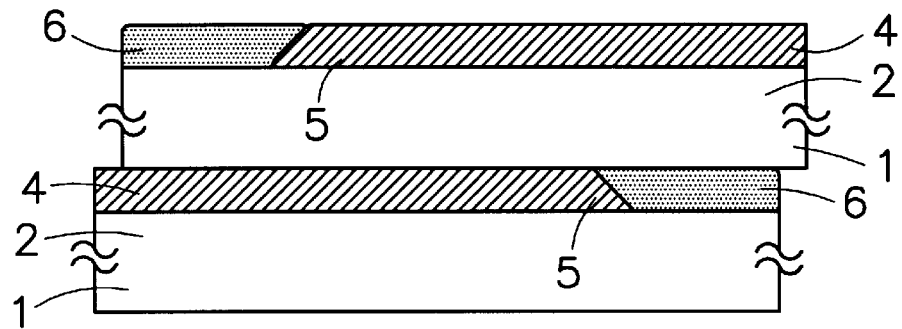
FIG. 4 is a schematic sectional view of a sectional form of metallized films of the invention overlaid to make a capacitor.
Figure 5:
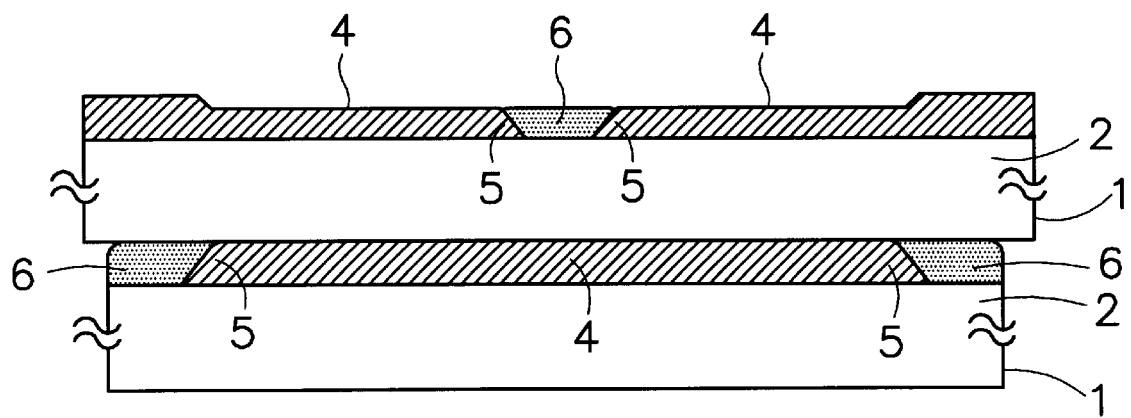
FIG. 5 is a schematic sectional view of another sectional form of metallized films of the invention overlaid to make a capacitor.
Figure 6:
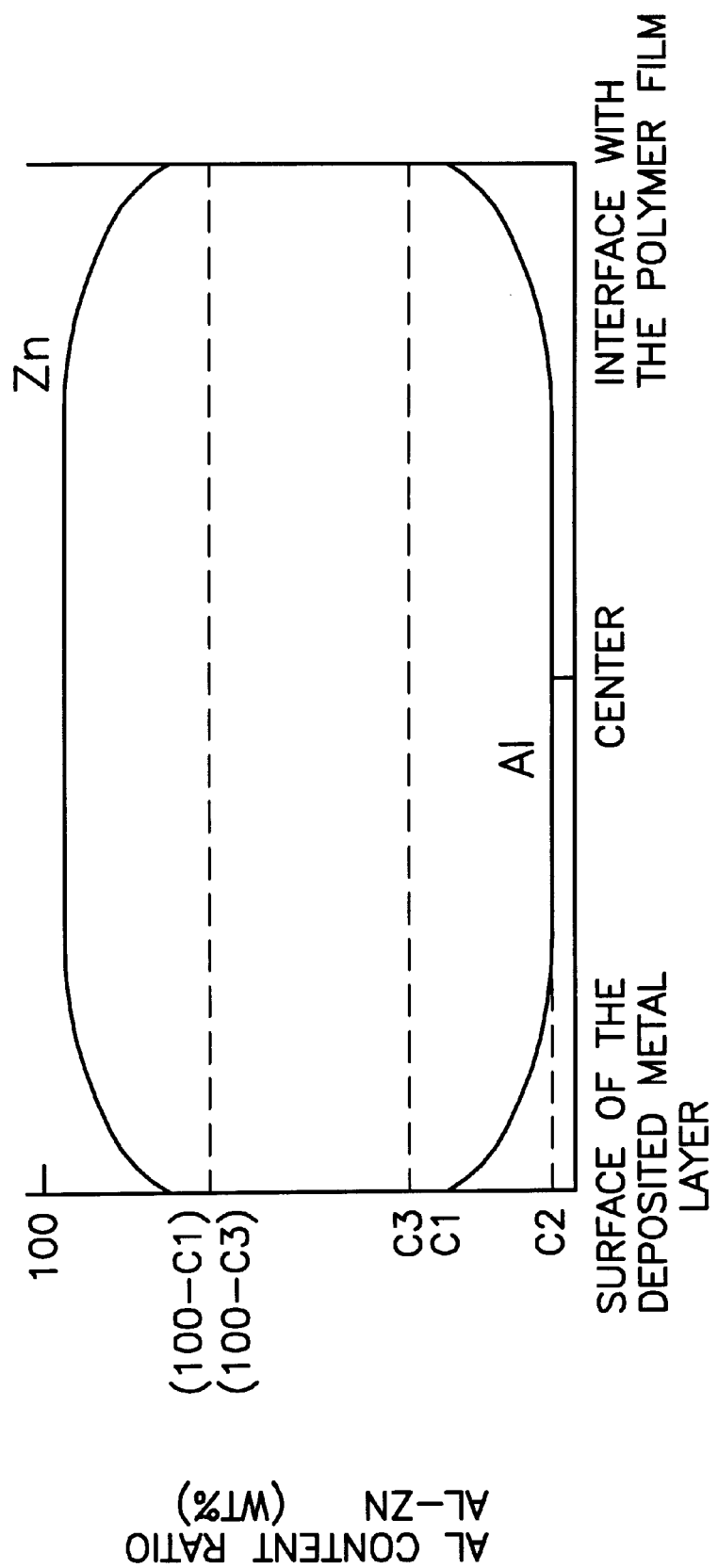
FIG. 6 is a graph showing an example of the aluminum-zinc content ratio in the deposited metal layer zone of the metallized film of the invention.

Moreover, as shown in FIG. 4, when the metallized film is wound to form a roll or stacked with other identical metallized films, it is preferable that the margin portions between respectively two adjacent overlying portions of the metallized film or the two adjacent overlying metallized films are filled with an oil 6, thereby being free from formation of an air layer.

In this case, oil 6 can be compatible with oil used for impregnating the capacitor, so that oil 6 and the impregnating oil may fill the margin portions to eliminate any air layer. It is preferable that oil exists in the margin portions so that the margin portions between the overlying portions of the metallized film or the overlying metallized films forming a capacitor are filled with oil to be free from any air layer.

Of course, the margin is intended for electric insulation, and the surface resistance should be about $10^{10}$ Ω/sq. or more, preferably $10^{12}$ Ω/sq. or more.

Figure 7:
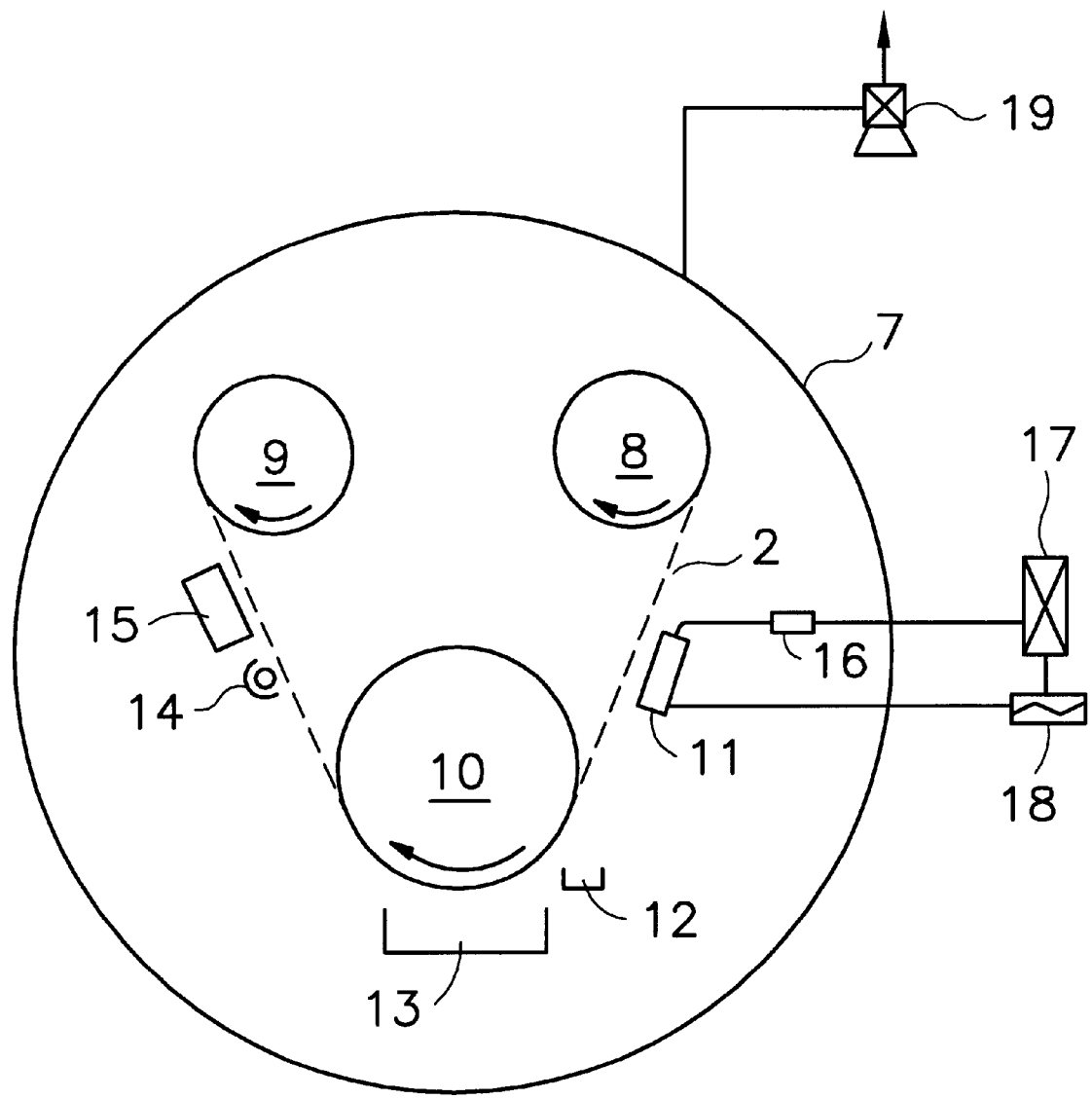
FIG. 7 is a schematic drawing showing an apparatus for producing a metallized film of the invention.

FIG. 7 shows an apparatus for producing the metallized film of the invention. The method for producing a metallized film of the invention is briefly described below with reference to FIG. 7 as well.

A vacuum metallizer 7 is internally reduced to a predetermined pressure (vacuum degree) by a vacuum pump 19. When a specified pressure has been reached, a predetermined amount of oil is vapor-deposited onto a polymer film 2 unwound from an unwinding roll 8, through an opening for the width of the margin width (actually approximately twice the width of the margin) of an oil evaporating nozzle 11 controlled at a specific internal pressure identified by measurement. Then, a predetermined amount of Al is evaporated from an Al evaporation source 12. The Al acts as a nuclei for Zn and is deposited on the polymer film 2.

In succession, Zn is evaporated from a Zn evaporation source 13 to be deposited so that the surface resistance of the deposited metal layer may be as specified. Subsequently, as required, the deposited metal layer zone, the boundary zone and the margin are treated on the surface by a gas plasma containing oxygen atoms using a low temperature plasma device 14. Furthermore, as required, through the narrow opening of an oil evaporator 15 controlled at an internal pressure identified by measurement, oil is evaporated and deposited on the surface of the deposited metal layer zone, the boundary zone and the margin. The metallized film in which the deposited metal layer zone and the margin are formed is wound by a winding roll 9, and finally taken out of the vacuum metallizer 7, being slit into a necessary narrow width and reeled.

In this method, it is very important in controlling the width of the boundary zone, to measure and control the internal pressure of the oil evaporating nozzle 11. The pressure in the oil evaporating nozzle 11 is measured by a diaphragm type or other pressure gauge (vacuum gauge) 16, and the output signal is applied to a control system 17. If the pressure in the oil evaporating nozzle 11 is different from the set value, it is fed back to a heater output power supply 18 for the control system 17 to keep the pressure in oil evaporating nozzle 11 constant so that a predetermined quantity of oil vapor is always formed. This ensures that a predetermined quantity of oil is deposited on the surface of polymer film 2. Al and Zn are not deposited or are very slightly deposited in a very limited amount on the margin where oil is deposited.

As shown in FIG. 3, oil 6 covering margin 3 does not exist in a uniform thickness. It exists in a "crest" thickness distribution. We believe that when the metal is deposited, the oil is partially evaporated at the end by condensation heat and the metal is deposited in inverse proportion to the oil concentration to form a boundary zone continuously decreasing in thickness. Therefore, we believe that in the relationship between the amount of oil covering the margin and the degree of evaporation at the end of the oil, the kind of the oil used plays an important role in forming the boundary zone.

A low temperature plasma treatment is preferable for controlling the width of the boundary zone and for improving the phenomenon that the capacitor generates noise when a voltage is applied if the adhesion between film layers is poor. The low temperature plasma treatment refers to exposing the metallized film to a plasma generated by a discharge initiated and maintained by applying a high voltage of direct current or low frequency, medium frequency, high frequency or other alternating current, or microwaves, etc., for modifying the surface.

The metallized film of the invention is wound to form a roll or stacked with other similar metallized films, and processed to make a capacitor with a high ability to withstand high voltage. It is especially preferable to use an oil compatible with the oil covering margin 3 and high in electric insulation as the impregnating oil since a capacitor with a higher ability to withstand high voltage can be produced.

An oil is judged to be compatible with the oil covering the margin 3, if when a sealed 100 cc sample bottle containing 30 cc each of the oil used to cover the margin 3 and the impregnating oil is sufficiently shaken and allowed to stand for 30 minutes, the mixture is not separated into two layers or not suspended, and is dissolved and remains transparent. As a more simple method, a swab impregnated with an impregnating oil is used to apply the impregnating oil to the surface of the metallized film from the deposited metal layer zone to the margin 3 according to JIS K 6768-1971 "Wet test methods for ethylene and polypropylene films", and if the coating width of the impregnating oil on the margin is not narrowed and remains the same or widens, the impregnating oil is judged to be acceptable.

It is more preferable that the oil covering the margin is a silicone oil and that the impregnating oil is also a silicone oil. An especially excellent silicone oil is dimethyl polysiloxane or methylphenyl silicone oil.

The margin 3 of the metallized film of the invention refers to the margin (free margin or the margin stated in JIS C 2319-1997) formed for ensuring the insulation between the deposited metal layer and the schoop layer as shown in FIG. 1, and also the margin for safety mechanisms proposed in Japanese Patent Publication (Kokoku) No. 1-21613, Japanese Patent Laid-Open (Kokai) Nos. 4-225508 and 7-86088, U.S. Pat. No. 5,057,967, etc., or a margin formed to keep electrodes separated.

Even conventional capacitors with such a margin for safety mechanisms or a margin for keeping electrodes separated have the problem that dielectric breakdown occurs at the boundary between the deposited metal layer zone and the margin, thereby lowering capacity. However, the capacitor produced by using the metallized film of the invention is remarkably improved in that problem.

The margin for safety mechanisms can be formed as described in Japanese Patent Laid-Open (Kokai) No. 63-114956 (U.S. Pat. No. 4,832,983). In the metallized film of the invention, oil 6 remains after metallization to cover margin 3, and boundary zone 5 is formed.

In the conventional metallized film for a capacitor, it is important for quality that the margin does not have the boundary zone and that no oil remains on the margin. However, just the opposite is true in the invention. The boundary zone is formed and oil remains on the margin. The result is a metallized film with a very high ability to withstand high voltage.

A capacitor using the metallized film of the invention is suitable as a capacitor for an application requiring a high ability to withstand high voltage. It is especially excellent as a capacitor in conformity with the safety standards requiring high ability to withstand high voltages. The metallized film of the invention is suitable for producing a small capacitor with excellent performance.

The metallized film of the invention has the margin covered with an oil unlike the conventional metallized films. So, conventional capacitor manufacturing conditions such as press conditions may need to be changed. However, such change is a matter of course for persons skilled in the art to set optimum processing conditions suitable for the respective metallized films.

In the invention, physical properties were measured according to the following methods.

(1) Composition of Al—Zn alloy

Nine square centimeters of a metallized film sample was dissolved by diluted nitric acid and the solution was diluted to have a volume of 20 ml. The solution was analyzed by ICP emission spectral analysis to determine the presence of Al and Zn. The ICP emission spectral analyzer used was Model SPS1200VR produced by Seiko Denshi Kogyo K.K.
(2) Al—Zn composition distribution An Auger electron spectral analyzer, Model AMP-10S produced by JEOL was used to determine distribution of Al and Zn while etching the surface of the deposited metal layer with Ar ions.

The Ar ion etching conditions were:

Accelerating voltage: 3 kV

Sample current: $1 \times 10^{-6}$ A

Etching rate: 190 Å/min in terms of $SiO_2$

The measuring conditions were:

Accelerating voltage: 3 kV

Slit No.: 5

Sample current: $8 \times 10^{-6}$ A

Sample inclination angle: 72 degrees

Beam diameter: 10 µm

The film interface refers to the position at which the Al content is maximized in a range where the Al content increases to reach the maximum and subsequently decreases in a range from the center of the deposited metal layer to the film interface. The content ratio at the maximum point is expressed by C3.

(3) Width of boundary zone

The boundary between the deposited metal layer zone and the margin was measured at a magnification of 50 to 100 times using an optical microscope and the value was read to the third decimal place, being rounded at the third decimal place.

A slit roll was used for measurement. Measurement was effected at 10 points at 50 cm intervals of the metallized film, and the lowest value, the highest value and the average value were obtained.

(4) Existence of oil on the margin

The margin was observed by XPS (ESCA), to confirm whether or not oil was present.

Instrument: SSX-100-206 produced by SSI

Exciting X rays: Monochromatized Al $K\alpha1.2$ rays (1486.6 eV)

Photoelectron escape angle (θ): 35°

Energy correction: Binding energy of CIS main peak was adjusted to 284.6 eV.

Since XPS has good sensitivity, it detects oil as a contaminant when present in low quantities. However, if the margin is covered with oil, the signal from the detected oil is remarkably high, to allow the distinction from contaminating oil.

(5) Molecular weight distribution of the oil on the margin

The surface of the metallized film was washed by isopropyl alcohol, and the oil contained in the washing solution was measured using gel permeation chromatograph GPC-244 (Waters) and differential refractometer detector R-401 (Waters), and molecular weights were calibrated using polystyrene.

In the case of a silicone oil with phenyl groups, TSK-gel-G3000HXL (1) and G2500HXL (1) (Tosoh Corp.) were used as columns.

EXAMPLES

Examples 1, 2, 3 and 4, and Comparative Examples 1, 2, 3 and 4.

On an 8 µm thick polypropylene film, a deposited Al—Zn alloy layer with a total width for two zones of 33 mm and a margin (non-deposited zone) with a total width for two zones of 5 mm was formed for each of Examples 1, 2, 3 and 4 and Comparative Examples 1, 2 and 3. In Comparative Example 4, a deposited Al layer with the same width and a margin with the same width was formed.

In Examples 1, 2, 3 and 4 and Comparative Examples 1, 2 and 3, a metallic pipe (margin nozzle) containing an oil for forming the margin or a polypropylene film unwound from the unwinding side of a vacuum metallizer was heated to evaporate the oil from an almost rectangular hole opened on the surface of the pipe, to have a width shorter than the width (actually approximately double the width) of the margin by the thermal expansion allowance in the width direction, for depositing the oil at the portion destined to be the margin on the surface of the film at a vapor deposition rate of 400 m/min. Then, Al was vapor-deposited and, in succession, Zn was continuously vapor-deposited. In succession, except for Comparative Example 3, all of the surface of the deposited metal layer zone, the boundary zone and the margin was treated by a low temperature plasma of oxygen gas and, subsequently, had the same oil as the margin oil evaporated and deposited. Then, the film was wound by a winding roll. In Comparative Example 3, the film was wound after it had Zn vapor-deposited.

The temperatures of the Al and Zn evaporation sources were controlled to form a deposited metal layer of 2.4 wt % in entire Al content ratio, 6.0 wt % as C1, 0.1 wt % as C2, 14.0 wt % as C3 and 4 Ω/sq. in resistance.

The margin oil used in Examples 1, 2, 3 and 4 and Comparative Examples 1 and 2 was phenylmethyl dimethyl polysiloxane of 520 in MW and 1.0 in MW/MN (SH702 produced by Toray Dow Corning Silicone K.K.). In Example 1, the internal pressure of the margin nozzle was controlled at 60 Pa, and the boundary zone widths measured at 10 points at 50 cm intervals in the slit roll circumferential direction were 0.02 to 0.04 mm.

Similarly, in Example 2, the pressure was controlled at 52 Pa and boundary zone widths were kept in a range from 0.05 to 0.07 mm.

In Example 3, the pressure was controlled at 45 Pa, and the boundary zone widths were kept in a range from 0.2 to 0.4 mm.

In Example 4, the pressure was controlled at 35 Pa, and the boundary zone widths were kept in a range from 0.8 to 1.0 mm.

In Comparative Example 1, the pressure was controlled at 70 Pa and the boundary zone widths were kept in a range of less than 0.01 mm (like an ordinary margin).

In Comparative Example 2, the pressure was controlled at 25 Pa, and the boundary zone widths were kept in a range from 1.3 to-1.5 mm. In the above examples, in reference to the pressure in the oil evaporating nozzle, the margin nozzle temperature was controlled to control the pressure in the oil evaporating nozzle.

In Comparative Example 3, perfluoro polyester oil was used as the margin oil, and the oil vapor pressure was kept at 40 Pa, while the margin nozzle temperature was controlled to keep the boundary zone width at less than 0.01 mm (like an ordinary oil margin).

In Comparative Example 4, a heat resistant film was used, and a margin zone corresponding to two margins with a total width of 5 mm was formed at a vapor deposition rate of 300 m/min. According to the tape margin method, Al was vapor-deposited to form a deposited metal layer with a resistance of 4 Ω/sq.

The respective metallized films were slit at the center of the deposited metal layer zone and at the center of the margin zone, by an ordinary method, to have metallized film reels (19 mm wide) respectively with a deposited metal layer zone width of 16.5 mm and a margin width of 2.5 mm.

Figure 8:
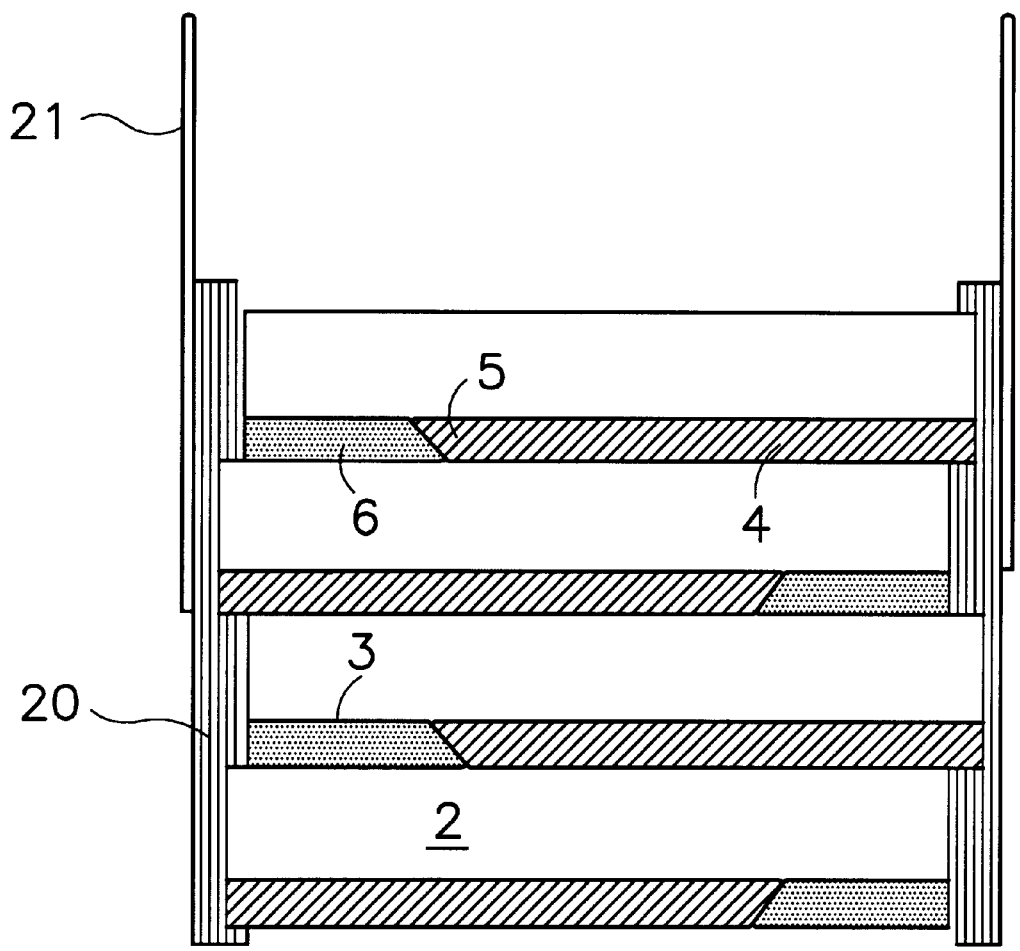
FIG. 8 is a schematic drawing showing an example of the sectional form of a capacitor produced by overlaying and winding the metallized films of the present invention into a roll.

The slit metallized films were overlaid by an ordinary method as shown in FIG. 2 and wound to form rolls, respectively, pressed, had a schoop layer attached, heat-treated and had an electrode attached, to make element capacitors as shown in FIG. 8. Then, they were impregnated with dimethyl polysiloxane oil (100 cst in viscosity) and armored with an epoxy resin by an ordinary method, to produce 0.15 μF capacitors.

These capacitors had an AC voltage of 1250 V AC (60 Hz) applied for 1 minute according to UL 1414, to examine their breakdown conditions. The capacitors were visually observed after completion of the test and, subsequently, disassembled to confirm the breakdown positions by an optical microscope.

The margins of the metallized film reels were also observed by XPS to check whether the margins were covered with oil.

The results are shown in Table 1. It can be seen that the products of the present invention (Examples 1 to 4) were not broken, showing very excellent performance.

parative examples.

TABLE 2

| | Metallized film production conditions | Broken samples/ Tested samples | |
| --- | --- | --- | --- |
| | (metallization conditions) | 1250VAC | 1500VAC |
| Example 5 | Example 2 | 0/30 | 0/30 |
| Comparative Example 5 | Comparative Examaple 1 | 3/30 | 20/30 |
| Comparative Example 5 | Comparative Example 2 | 2/30 | 16/30 |
| Comparative Example 6 | Comparative Example 3 | 5/30 | 26/30 |
| Comparative Example 7 | Comparative Example 4 | 7/30 | 30/30 |

Although this invention has been described in connection with specific forms thereof, it will be appreciated that a wide variety of equivalents may be substituted for the specific elements described herein without departing from the spirit and scope of this invention as described in the appended claims.

INDUSTRIAL APPLICABILITY

The metallized film of the invention has a boundary zone between the deposited metal layer zone and the margin and

TABLE 1

| | Oil vapor pressure (Pa) | Width of the boundary zone (L) | Result of oil analysis by XPS | Broken samples/Tested samples | Broken position |
| --- | --- | --- | --- | --- | --- |
| Example 1 | 60 | 0.02–0.04 | Much oil (large Si signal) | 3/100 | |
| Example 2 | 52 | 0.05–0.07 | Much oil (large Si signal) | 1/100 | |
| Example 3 | 45 | 0.2–0.4 | Much oil (large Si signal) | 0/100 | |
| Example 4 | 35 | 0.8–1.0 | Medium oil (medium Si signal) | 1/100 | |
| Comparative Example 1 | 70 | Less than 0.01 | Much oil (large Si signal) | 29/100 | Broken at Schoop portion (at boundary of deposited metal layer zone, or slightly inside deposited metal) |
| Comparative Example 2 | 25 | 1.3–1.5 | Medium oil (medium Si signal) | 18/100 | Broken at Schoop portion (at boundary of deposited metal layer zone, or slightly inside deposited metal) |
| Comparative Example 3 | 40 | Less than 0.01 | Medium oil (medium Si signal) | 56/100 | Broken at Schoop portion (at boundary of deposited metal layer zone, or slightly inside deposited metal) |
| Comparative Example 4 | — | Less than 0.01, tape margin | Contaminated (slight Si signal) | 100/100 | Broken at Schoop portion (at boundary of deposited metal layer zone, or slightly inside deposited metal) |

Example 5, and Comparative Examples 5, 6, 7 and 8

Metallized films were produced under the conditions shown in Table 2, using a 10 μm polyethylene terephthalate film in Example 5, and a 12 μm polyethylene terephthalate film in Comparative Examples 5, 6, 7 and 8. Then, as described in Example 1, capacitors were produced. The capacitor production conditions were the conditions generally adopted for producing capacitors using metallized polyester films (metallized polyethylene terephthalate films). These capacitors were tested as described in Example 1, except that the voltages applied were 1250 V AC and 1500 V AC. The results are shown in Table 2.

As shown in Table 2, the capacitor of the present invention (Example 5) showed excellent performance, though the film thickness was thinner by 2 μm than that of the comhas the margin covered with an oil. When high voltages are applied to capacitors in safety standards testing, breakdowns near the margin rarely occur, and capacitors with very high safety can be produced.

What is claimed is:

1. A metallized film comprising:

a polymer film, a metal layer having a surface resistance of about 1 Ω/sq. to about 15 Ω/sq. deposited on a portion of said polymer film, said polymer film having another portion defined as a margin having a surface resistance of about $1 \times 10^{10}$ Ω/sq. or more, which portion is free of deposited metal; and an about 0.02 to about 1 mm wide boundary zone of deposited metal formed between the deposited metal layer and the margin which substantially continuously decreases in thickness from the deposited metal layer to the margin.

2. The metallized film according to claim 1, wherein the boundary zone has a width of about 0.02 to about 0.5 mm.

3. The metallized film according to claim 1, wherein the boundary zone has a width of about 0.02 to about 0.25 mm.

4. The metallized film according to claim 1, wherein the boundary zone has a width of about 0.05 to about 0.2 mm.

5. The metallized film according to claim 1, wherein the margin is covered with oil.

6. The metallized film according to claim 5, wherein the oil is selected from the group consisting of mineral oil and silicone oil.

7. The metallized film according to claim 6, wherein the oil is silicone oil.

8. The metallized film according to claim 7, wherein the silicone oil has a weight average molecular weight MW of $300 \leq MW \leq 800$, and a ratio of the weight average molecular weight MW to a number average molecular weight MN is $1.0 \leq MW/MN \leq 1.1$.

9. The metallized film according to claim 7, wherein the silicone oil is selected from the group consisting of dimethyl polysiloxane oil and methylphenyl silicone oil.

10. The metallized film according to claim 9, wherein the silicone oil is methylphenyl silicone oil.

11. The metallized film according to claim 1, wherein the deposited metal layer is composed of an alloy consisting of Al or Zn and has an Al content: ((Al content in wt.×100)/(Al content in wt.×100+Zn content in wt.×100)), which changes continuously according to $C2<C1 \leq C3$ or $C2<C3 \leq C1$, wherein C1 is the Al content ratio at the surface of the deposited metal layer away from the polymer film; C2 is the Al content ratio at center portion deposited metal layer and C3 is the Al content ratio at an interface between the deposited metal layer and the polymer film, while the Al content ratio of the entire deposited metal layer is about 0.5 to about 15 wt %.

12. The metallized film according to claim 11, wherein the Al content ratio of the entire deposited metal layer is about 8 to about 12 wt %.

13. The metallized film according to claim 11, wherein the Al content ratio changes according to $C2<C1 \leq C3$.

14. The metallized film according to claim 1, wherein the deposited metal layer, the boundary zone and the margin are treated by a low temperature plasma.

15. A metallized film comprising a metal layer having a surface resistance of about 1 $\Omega$/sq. to about 15 $\Omega$/sq. deposited on a portion of a polymer film such that:

i) a remaining portion of said film is not covered by said metal layer, said remaining portion having a width of about 0.02 to about 1 mm, and ii) a boundary zone of deposited metal having a surface resistance of about $1 \times 10^{10}$ $\Omega$/sq. or more, lies between said metal layer and said remaining portion, said boundary zone continuously decreasing in thickness from the metal layer to the remaining portion.

16. The metallized film according to claim 15, wherein said remaining portion is covered with oil.

17. In a process of producing a metallized polymer film as defined in claim 1 by vapor-depositing an oil on a surface of said polymer film or coating a surface of said polymer film with an oil and subsequently vapor-depositing a metal onto a portion of said polymer film in a vacuum metallizer, the step comprising:

controlling the quantity of the oil applied by vapor deposition or coating and maintaining the width of the boundary zone between the deposited metal layer and the margin in a range of about 0.02 to about 1 mm.

18. The method for producing the metallized film according to claim 17, wherein when a oil is applied by vapor deposition or coating, the pressure in an oil evaporator used to apply said oil is measured and controlled.

19. The method for producing the metallized film according to claim 17, wherein after a main metal has been vapor-deposited in a vacuum evaporator used to apply said main metal to said polymer film, a low temperature plasma of a gas containing oxygen atoms is used for treating the surface of the deposited metal layer, the boundary zone and the margin.

20. A capacitor produced by i) winding into a roll metallized film or ii) stacking said metallized film with other substantially identical metallized films comprising a polymer film; a metal layer having a surface resistance of about 1 $\Omega$/sq. to about 15 $\Omega$/sq. deposited on a portion of said polymer film, said polymer film having another portion defined as a margin having a surface resistance of about $1 \times 10^{10}$ $\Omega$/sq. or more which another portion is free of deposited metal; and an about 0.02 to about 1 mm wide boundary zone of deposited metal formed between the deposited metal layer and the margin which continuously decreases in thickness from the deposited metal layer to the margin.

21. The capacitor according to claim 20, wherein an oil compatible with an oil covering the margin is used as an impregnating oil.

22. The capacitor according to claim 21, wherein the oil covering the margin and the oil used as an impregnating one are a silicone oil.

23. The capacitor according to claim 22, wherein the silicone oil is selected from the group consisting of dimethyl polysiloxane oil and methylphenyl silicone oil.

* * * * *